March 27, 1962 W. C. RIVERS 3,027,187
VAN BODY ROOF AND WALL CONSTRUCTION
Filed Feb. 9, 1959 3 Sheets-Sheet 1

INVENTOR.
WILLIAM C. RIVERS
BY George H. Baldwin
ATTORNEY

March 27, 1962
W. C. RIVERS
3,027,187
VAN BODY ROOF AND WALL CONSTRUCTION
Filed Feb. 9, 1959
3 Sheets-Sheet 2
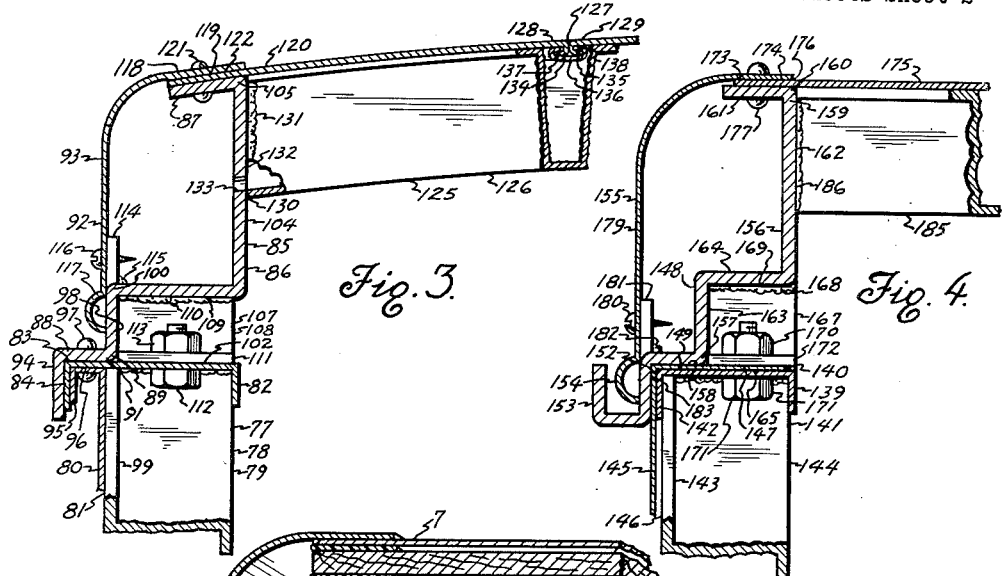
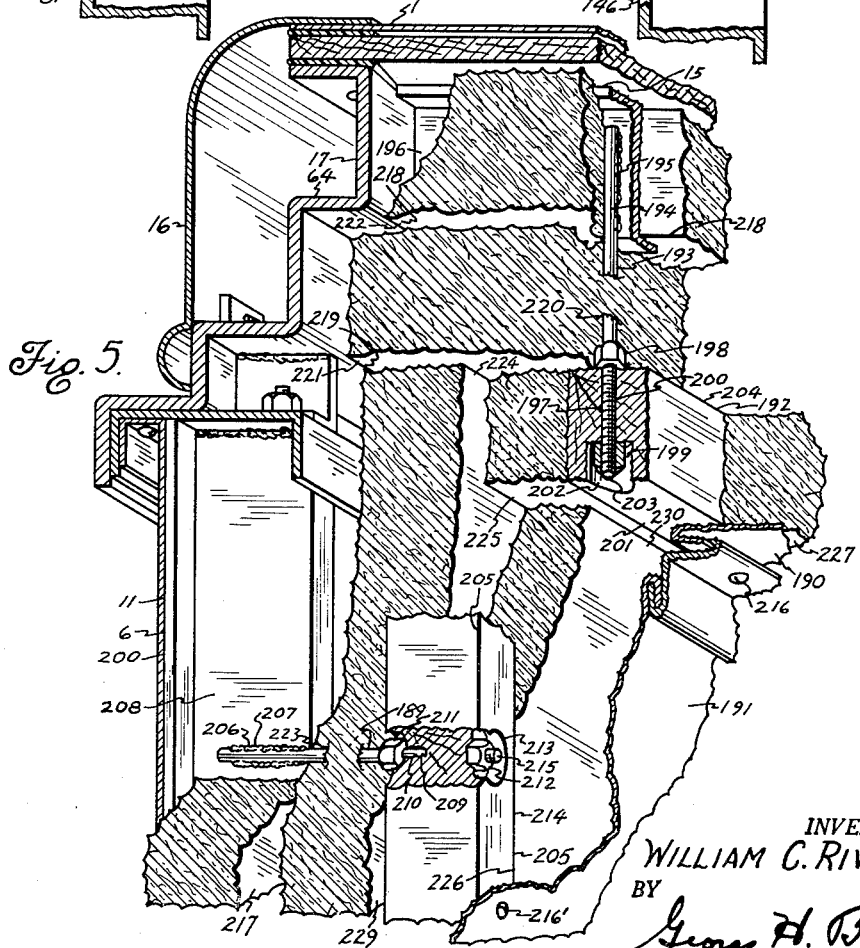
INVENTOR.
WILLIAM C. RIVERS
BY
George H. Baldwin
ATTORNEY March 27, 1962  W. C. RIVERS  3,027,187
VAN BODY ROOF AND WALL CONSTRUCTION
Filed Feb. 9, 1959  3 Sheets-Sheet 3

INVENTOR.
WILLIAM C. RIVERS
BY
George H. Baldwin
ATTORNEY

United States Patent Office 3,027,187
Patented Mar. 27, 1962

3,027,187
VAN BODY ROOF AND WALL CONSTRUCTION
William C. Rivers, P.O. Box 2239, Jacksonville, Fla.
Filed Feb. 9, 1959, Ser. No. 791,910
22 Claims. (Cl. 296—28)

This invention relates to van bodies for trucks, trailers and the like. More particularly it relates to a van body construction which is designed to protect or shield the interior of the van body from water leakage which occurs along the side walls of the van body in the regions of joints formed by metal fasteners between side wall panels and which occurs particularly in the regions of the roof and at the edges thereof adjacent to the side walls of the van body. An important aspect of the invention pertains to insulated van bodies and to a construction therefor which provides for spacing the inner walls and ceiling from the outer walls and roof and for securing insulation therebetween.

It is a general object of the invention to provide an improved van body construction.

A particularly troublesome problem to be overcome in the construction and design of van type bodies is the passage of water through joints between adjacent metal components of the body and especially through the metal joints in the regions of the roof and edges between the roof and the walls of the van. Such water is damaging to the cargoes carried in the van bodies and in the case of insulated bodies is damaging to the insulation and a cause of undesired heat transfer between the exterior and interior of the van body. Typical of the joints referred to are those which are formed along the edge portions of the roof covering. Such joints are usually formed with metal fasteners as by riveting the edge portion to a suitable underlying member, such as a roof supporting rail, in a manner such that the rivets extend from the exterior of the van body to its interior. Since the rivets employed in this construction often do not completely seal the holes formed for their reception in the edge portion of the roof covering and in the rail, water seeps through the riveted joints and into the interior of the van body. Mastics and other caulking compounds are frequently employed in one form or another to seal such joints, but eventually such compounds become embrittled and crack or are otherwise damaged in the regions adjacent to the rivet holes because of movements of the frame members caused by the vibrations encountered in the use of the van body. Such cracks and other damage, of course, afford passageways for water to leak through to the interior of the van. Repairs may necessitate disassembly of the joint and the replacement of the mastic or other caulking material, and such repair is expensive not only in material and labor costs but also because of the inoperativeness of the truck or trailer during the period of its repair.

Successful meeting of the problems of water leakage is made more difficult by the practical necessity for using metal fasteners when attaching wall and roof coverings to the frame of the van bodies since such coverings are usually composed of metal sheets which, like aluminum, are difficult and impractical to fasten by means which provide a waterproof joint such as attainable by welding. Further difficulties stem from the desirability to limit encroachment upon the interior space of the body, by the necessity of supporting the roof rail of the body frame firmly upon the wall lintel of the body, and by the practical necessity of providing an attractive smoothly rounded external body surface where the wall and roof join. The difficulties are further increased when insulation is to be included in the body for which space must be provided in the roof edge and wall top construction and means provided at or adjacent the edge for retaining the insulation in place.

Accordingly it is an object of the invention to provide a van body construction which overcomes the problem of leaky joints in the regions of the roof and edges thereof and along the side walls of the van body.

Another object of the invention is to provide a van body construction in which the joints at the edges of the roof covering may leak without the water entering the interior of the van body.

Still another object of the invention is to provide a van body construction which permits the use of fasteners, such as bolts, screws, rivets and the like, in the regions of the roof covering edges without concern for the passage of water through the joints formed thereat and along the side walls between adjacent wall panels without such concern respecting water passage.

A specific object of the invention is to provide a van body with an edge assembly in which the principal elements joining with the assembly or forming parts thereof and which are most subject to being damaged and thereby needful of repairs may be joined thereto by means of rivets, bolts, screws and other like fasteners without thereby forming joints which leak water into the interior of the van body.

Yet another object of the invention is to provide an insulated van body arrangement wherein suitable supporting or suspending means are included for insulation disposed between the outer and inner walls and roofs of the van body, said means being so arranged as to avoid metal to metal contact between the metal panels of the inner walls and roof and the metal framework of the exterior walls and roof.

A still further object of the invention is to facilitate the installation of insulating blocks in a van body and to minimize the amount of material cut out of the blocks to permit adequate support thereof.

It is a further specific object of the invention to provide an improved roof rail for van bodies which is so shaped as to provide adequate roof support, as to prevent water from entering into the body between the wall top and the roof edge, and as to be useful when insulation is to be included in the body with minimum encroachment upon the interior capacity of the body and with improved insulation efficiency at the top wall and outer roof edges.

While certain of the above objects are stated in terms relating to the prevention of water leakage into the van body, and particularly into the insulation space of an insulated body, it will be recognized that insulation can become less effective merely from dampness or water vapor entering the body through external joints, and it is, accordingly, an important object of the invention to minimize air leakage into the insulation space in van bodies.

Troublesome problems have existed in van bodies in connection with the mounting of external body lights and the provision of conductors therefor, and another specific object of the invention is to provide protecting means for upper wall body lights and to provide improved means for housing electrical conductors for supplying power to the lights whereby the conductors are readily accessible for inspection and replacement when necessary.

The novel features which are believed to be characteristic of this invention are set forth with particularity in the appended claims. The invention itself, however, both as to its organization and method of operation, together with further objects and advantages thereof may best be understood by reference to the following description taken in connection with the accompanying drawings, in which:

FIG. 3 is a similar fragmentary sectional end view of a van body edge construction in accord with a first modification of the invention which is particularly useful with bowed roof constructions;

FIG. 4 is another similar fragmentary end view of a second modification of the invention;

FIG. 5 is a fragmentary perspective view of the embodiment shown in FIGS. 1 and 2 with insulation and inner ceiling and wall structure in place;

Figure 1:
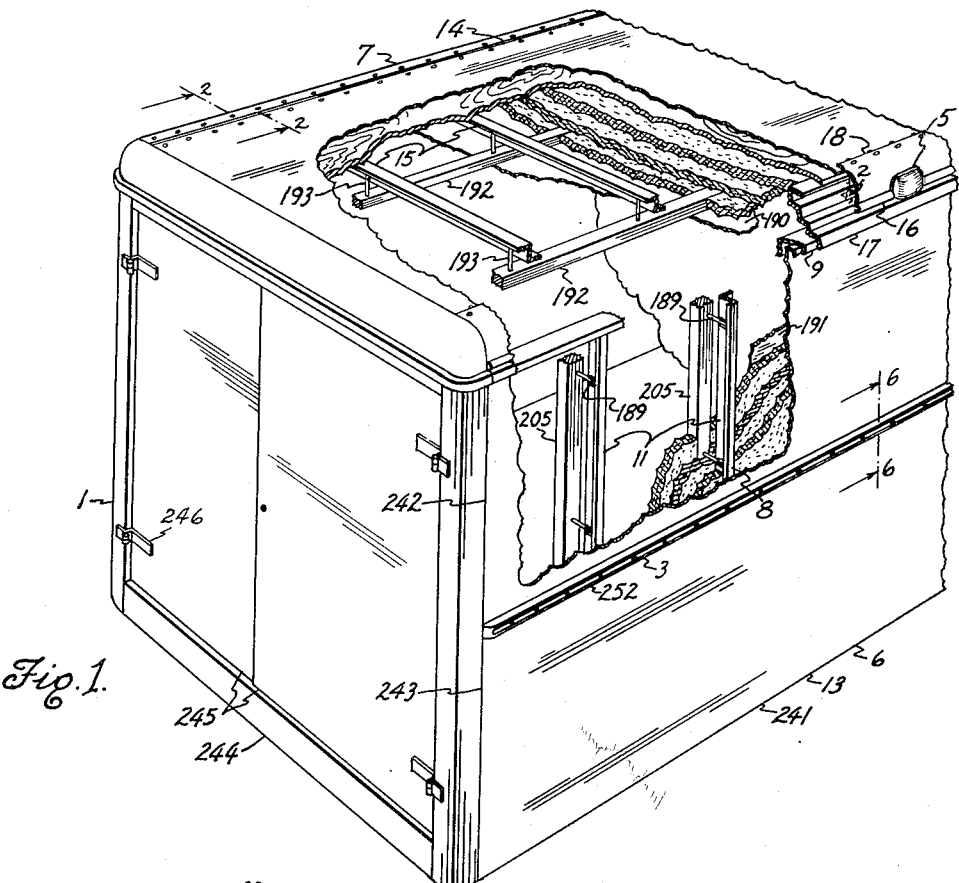
FIG. 1 is a perspective view of a van body with certain parts being broken away and others removed illustrating the general arrangements contemplated in the construction of insulated bodies according to the invention.

The van body 1 shown in FIG. 1 is of the type which is employed for insulated trailers and trucks, and, as will be evident hereinafter, certain features of the illustrated construction are applicable to dry load carrying van bodies as well as to insulated van bodies. The van body 1 includes an outer wall assembly 6 which extends along the sides of the van and which comprises an outer wall covering 13 and an outer wall frame 8 which is constituted by upstanding and suitably spaced wall posts 11 and an overlying lintel 9. Mounted on the wall assembly 6 is a roof assembly 7 which includes an edge assembly 18, suitably spaced roof rafters 15 and a roof covering 14. The edge assembly 18 is constituted by a rail 17, to be described more fully hereinafter, and an edge cap 16 which extends along the edge of the van body and forms a juncture between the wall covering 13 and the roof covering 14. Attached to the wall frame 8 of the wall assembly 6, and more particularly to the posts 11 thereof, are suitably spaced upstanding inner wall battens 205 which, as more fully described hereinafter, provide a means to which an inner wall covering 191 is secured and a means for retaining insulation between the outer wall covering 13 and the inner wall covering 191. Suspended from the roof rafters 15 of the roof assembly 7 and extending lengthwise of the van body 1 in laterally spaced relationship are suitably spaced roof battens 192 to which is attached an interior covering 190 which forms the ceiling of the van body. The roof battens 192 support suitable insulating material which is preferably in block form and which is disposed between the roof covering 14 and the inner covering 190. It will be noted that elongated rod-like elements 193 and 189 are employed for spacing and connecting the respective battens 192 and 205 to the outer roof and wall assemblies. These rods, as will be more fully understood hereinafter, provide an especially effective means for supporting the inner wall and ceiling structure in their spaced relationship from the outer walls and roof structure, and additionally facilitate the assembling of such inner wall and ceiling structure and the disposition of the insulation blocks in their proper positions. A longitudinally disposed hollow rib 240 which forms a part of the wall frame is attached to the posts 11 and extends along the sides, such as side 241, of the van body, and, as will be seen, provides a means to which the individual wall panels, such as panels 242 and 243, may be secured by metal fasteners in a manner such that the fasteners need not enter the interior of the van body. At the rear end 244 of the van body suitable doors 245 are provided which are hinged to the wall assembly as by means of hinges 246.

Figure 2:
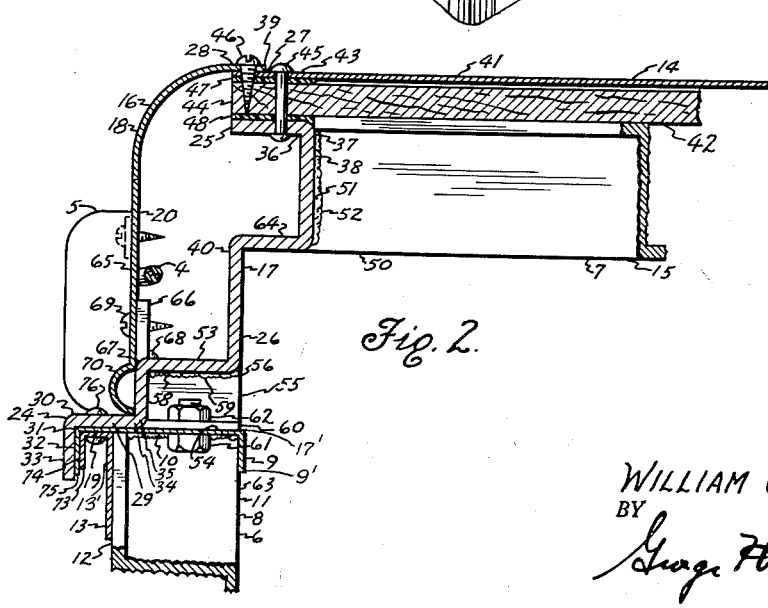
FIG. 2 is an enlarged fragmentary sectional end view of upper portions of a side wall and conjoining roof edge construction in accord with the preferred embodiment of the invention, taken generally along the lines 2—2 of FIG. 1, the insulation and certain inner ceiling and wall members being removed to promote clarity.

With reference to FIG. 2 and the preferred embodiment of the invention illustrated therein, there is shown in the figure, an edge assembly 18 which is attached to and forms a part of an outer roof assembly 7 and an outer wall assembly 6 upon which the roof assembly is mounted.

The wall assembly 6 includes a wall frame 8 which has an inverted U-shaped lintel 9 extending along its top portion 10 and an upstanding post 11 which is provided for supporting the lintel 9. The outer face 12 of the wall frame 8 is covered by a suitable outer wall covering or skin 13, such as aluminum sheet paneling.

The roof assembly 7 is composed of a roof covering 14 which overlies a suitably shaped rafter, such as Z-shaped rafter 15, and further includes an edge assembly 18, on the rail of which the rafter 15 is mounted. The edge assembly 18 extends along the lintel 9 of the wall frame 8 and it serves as the supporting means for the rafters and roof covering. This roof edge assembly 18, in the embodiment shown, is constituted by the rail 17 and an edge cap 16, the latter of which serves as a juncture between the wall covering 13 and the roof covering 14. The roof covering 14 in the embodiment shown is composed of two layers of sheet material, the outer layer being a thin metal skin, such as aluminum panel 41, and the inner layer being composed of plywood sheets, such as plywood sheet 42.

The top rail 17 which is incorporated in the edge assembly 18 is essentially characterized according to the invention by two portions 24 and 25 which are spaced one above the other and each of which is connected to an upstanding web 26 so as to extend outwardly therefrom. One of the outwardly extending rail portions forms a plate 24 which extends along and rests upon the top of the lintel 9, whereas the other outwardly extending portion forms a flange 25 which underlies and is connected to contacting edge portions, 27 and 28, of the roof covering 14 and edge cap 16 respectively.

The roof edge supporting flange 25 functions as a rigid body member to which the respective edge portions, 27 and 28, are connected by suitable fasteners. As previously indicated joints formed in this manner are susceptible to leakage, and because of their position relative to the fasteners, such as the rivet 45, the web portion 26 of the rail 17 and that portion 29 of the rest plate 24 which lies inwardly of the plane of the wall covering 13 serve as a continuous shield against the passage of such leakage into the interior of the van body. The rail is so formed and joined with the edge cap 16 at its lower portion as to permit this leakage to pass outwardly to the exterior of the van body.

The rest plate portion 24 of the rail extends along an outer portion 19 of the lintel, and in addition to having an inner portion 29 which, in the embodiment shown in FIG. 2, lies inwardly of the generally vertical plane of the wall covering 13, includes an outer portion 30 which extends outwardly along the lintel. From this outer portion 30 the rail then passes downwardly at the outer side edge 31 of the lintel 9 to overlap the outer side 32 thereof and to form an upper rub rail 33 along the van body. Side lights, such as light 5, are mounted on the lower portion of the edge cap 16 inwardly of the outer reaches of the rub rail, and the space between the cap 16 and the rail 17 serves as a convenient place to locate the wiring 4 therefor. The plate 24 itself is integrally formed with the web 26 and flange 25 and joins at its inner edge 34 with the lower edge 35 of the web 26, the juncture between the edges being continuous and unbroken so as to prevent the passage of water into the interior of the van body therealong.

In this embodiment, the flange portion 25 of the rail is located generally above but offset inwardly of the plate 24, and it is connected along its inner edge 36 to the upper edge 37 of the web 26 so as to extend outwardly from the upper portion 38 of the web. By extending outwardly from the upper portion 38 of the web 26, the joint, which is generally designated at 39 and which is formed between the flange and the edge cap 16 and roof covering 14, is disposed outwardly from the upper portion 38 of the web, and the web is thereby in a position such that it lies between the joint and the interior of the van body and shields the interior from water seepage through the joint. Such seepage as may occur through the joint 39 passes into the space between the outer face 40 of the rail and the inner face 20 of the edge cap 16 and drains to the exterior of the van body therebelow.

With respect to the joint 39, the edge portions 43 and 44 of the skin and plywood overlie the flange 25 and are connected thereto by means of spaced fasteners, such as rivet 45. The edge cap 16 is also connected to the flange portion 25 of the rail 17, screw type fasteners, such as screw 46, in this case being employed to facilitate separate removal of the edge cap 16 for its repair and for access to the wiring 4 of the light 5. The roof edge portion 28 of the edge cap 16 overlies the edge portion 43 of the metal roof skin, so that the fastening screws therefor pass through the edge cap and the intervening roof covering 14 and are threadedly engaged through the flange 25. Strips of caulking material such as strips 47 and 48 in the embodiment are preferably interposed respectively between the metal skin 41 and plywood sheet 42 and between the flange 25 and plywood 42, so as to aid in sealing the joint 39 against the passage of excess water therethrough and particularly against the passage of water through the joint between the adjacent fasteners.

The web portion 26 of the rail 17 functions as a mount for the roof rafters as well as a water impervious corner shield. The ends of the rafters are spaced one from the other along the inner face 51 of the rail 17 adjacent to the upper portion 38 of the web 26 and they are suitably connected thereto by means of welds, such as end weld 52 at the end 50 of rafter 15. The web 26 in the embodiment shown in FIG. 2 extends continuously along the lintel 9 and is unbroken in the sense that there are no interruptions in the web through which water may pass to the interior of the van body 1.

In connection with the securing of the rail 17 to the wall frame 8, it will be seen that the web 26 is formed with an outwardly facing step portion 53 which is spaced above an inner portion 54 of the lintel so as to provide a space above the lintel 9 for lug elements, such as lug 55, and a space for connecting such lugs to the rail 17 and to the lintel 9. The lugs are spaced one from the other along the inner portion 54 of the lintel 9 and, as exemplified by lug 55, are L-shaped and have an upstanding leg 56 which is suitably secured to the rail at the bottom 58 of the step 53 as by means of a weld 59. The other leg 60 of the lug rests upon the inner portion 54 of the lintel and is disposed inwardly of the plate. These legs 60 are attached to the inner portion 54 of the lintel by suitable means such as the nut 62 and bolt 61 employed for securing the leg 60 of lug 55 to the lintel. The securing bolt 61 passes upwardly through the inner portion 54 of the lintel 9 and through the leg 60 to the engaging nut 62 which threads on the bolt to rigidly clamp the lug to the lintel. This means for securing the rail 17 to the lintel 9 is advantageous in that it is easily released, by removing nut 62, so that the roof assembly 3 may be removed from the wall frame 8 for repair purposes, and in that it provides means for forcing the rail 17 and lintel 9 into rigid face to face contact.

Above and inwardly of the first step portion 53 and spaced below the flange 25 is another outwardly facing step portion 64 which disposes an upper portion 38 of the web inwardly of the inner face 63 of the wall frame 8 and against the ends of the rafters. Such offsetting of the upper portion 38 of the web disposes the flange 25 sufficiently inwardly of the plane of the side wall skin to permit the edge cap 18 to have a gently rounded form of attractive appearance.

The wall edge portion 65 of the edge cap 16 is disposed outwardly of its roof edge portion 28 and extends below the flange 25 in a plane which is generally parallel to that of the wall covering 13. Metal tabs, such as tab 66, are suitably spaced and attached along the outer face 40 of the rail 17, as along the outer edge 67 of step portion 53, by means of welds, such as weld 68, and the wall edge portion 65 of the edge cap is secured to the rail by means of screw type metal fasteners, such as by screw 69 which engages the tab 66. The wall edge portion 65 of the edge cap preferably protrudes or bulges outwardly to produce a ribbed lower portion 70 which extends along the outer face 40 of the rail 17 and thereby strengthens and renders the member more rigid in the regions adjacent to the face 40 of the rail. The water which seeps into the space between the rail 17 and the edge cap 16 makes its way downwardly between the spaced tabs and passes to the exterior of the van between the lower portion 70 of the edge cap and the face 40 of the rail.

It will be noted that the wall covering 13 has an upper edge portion 73 which passes outwardly from the plane of the wall covering 13 beneath the lintel 9 and thence extends downwardly along the inside 74 of the outer lip or flange portion 75 of the lintel and that rivets, such as rivet 76, are employed to connect this upper edge portion 73 of the wall covering to the flange and lintel. These rivets, such as rivet 76, are readily accessible from the exterior of the van body for removal and repair of the wall covering, and they communicate only with the exterior of the van body so that leakage therethrough fails to pass to the interior of the van.

It will be seen, accordingly, that, in the completed van body in accord with FIG. 2, for example, the roof rail 17 and lintel 9 constitute a roof rail and lintel assembly, generally indicated at 17', the members 17 and 9 being joined by lug 55 and nut and bolt 61, 62. This assembly 17' comprises plate portions 54 and 34 overlying and supported upon the upper ends of the wall posts, such as post 11, and including inner downward flange 9' and outer downward flanges 75 and 33, disposed, respectively, inwardly and outwardly of the wall posts. The upper edge portion 13' of the wall covering 13 meets plate portion 54 and is disposed inwardly of flanges 33 and 75 and, of course, between flanges 9' and 75.

The embodiment shown in FIG. 3 is similar in principle to that shown in FIG. 2 with the exceptions that certain modifications have been made to the rail so as to dispose the wall edge portion of the edge cap in substantially the same plane as the roof covering. Other modifications have also been made to provide for a bowed roof structure and to facilitate the removal of water which seeps through joints in the roof between adjacent edges of the roof panels.

In FIG. 3, the wall assembly 77 is essentially the same as that of FIG. 2 and includes a wall frame 79 which has a vertical post 78 and a wall covering 80 which is disposed against the outer face 81 of the frame. The lintel 82 extends along the wall post and caps the wall covering 80 in a manner similar to that described in connection with FIG. 2. The lintel includes an outer portion 83 upon which the rest plate of rail 85 is supported and which extends outwardly beyond the plane of the wall covering 80 and terminates in a downwardly extending flange or lip portion 84.

The rail 85 in the embodiment shown in FIG. 3 is composed of an upper outwardly extending roof edge supporting flange portion 87 and a lower rest plate portion 88, the rest plate and flange being respectively joined to a web portion 86 of the rail along its respective lower and upper edge portions, 89 and 90.

The inner edge portion 91 of the rest plate 88 joins with the lower edge portion 89 of the web 86 just inwardly of the plane of the wall covering 80 so that the wall portion 92 of the edge cap 93 may be disposed in essentially the same plane as the wall covering 80 when attached to the lower portion 98 of the web. From its juncture with the web, the plate 88 extends outwardly over the outer portion 83 of the lintel 82 and joins with a rub rail 94 which lies against the outer lip 84 of the lintel 82. The upper edge portion 95 of the wall covering 80 in this embodiment also extends outwardly from the general plane of the wall covering and underlies the underside 96 of the lintel outwardly of the plane of the wall covering so as to be attachable to the wall frame 79 and rest plate by exterior rivets, such as rivet 97, which are disposed outwardly of the vertical plane of the wall covering.

The lower portion 98 of the web 86 in FIG. 3 extends upwardly from its lower edge portion 89 generally in the same plane as the outer flange 99 of the Z-shaped wall post member 78, to the outer edge 100 of a step portion 101 of the web. The step 101 is parallel to and spaced above the inner portion 102 of the lintel 82, and from the inner edge 103 of this step 101, the web 86 extends upwardly to form an upper portion 104 which junctures with the inner edge 105 of the outwardly extending roof edge supporting flange 87.

As in the preferred embodiment shown in FIG. 2, the web shown in FIG. 3 provides a space between the inner portion 102 of the lintel 82 and the step 101 into which lugs, such as L-shaped lug 107, may be fitted to provide a means for clamping the rail 85 to the lintel 82. The lug 107 has an upstanding leg 108 which is rigidly secured to the rail by means of a weld 109 along the bottom 110 of the step 101 and another leg 111 which is disposed on the surface of the inner portion 102 of the lintel 82 which is rigidly secured to the wall frame lintel 82 by means of the bolt 112 and nut 113 shown in the figure.

To connect the wall edge portion 92 of the edge cap 93 to the rail 85, tabs, such as tab 114, are welded, as by means of weld 115, in spaced relationship along the outer edge 100 of the step 101, the wall edge portion 92 of the edge cap being secured to the tabs by means of suitable fasteners, such as screw 116. Protruding rib portion 117 of the edge cap 93 is similarly provided to lend rigidity to the cap in the region of its connection to the tabs.

The roof edge portion 118 of the edge cap 93 overlies and is in contact with the outer edge portion 119 of the roof covering 120 and both edge portions 119 and 118 overlie the flange 87 of the rail and are joined thereto by means of fasteners, such as rivet 121. The joint 122 formed in this embodiment is disposed outwardly of the upper portion 104 of the web 86 so that leakage through the joint passes into the space between the cap 93 and the web portion 86 of the rail from whence it may pass to the exterior of the van between the rib portion 117 of the edge cap 93 and the lower portion of the web. It will be understood that strips of sealing material may be employed in the connection between the edge portion and the flange in a manner similar to that shown in FIG. 2 if desired.

The roof assembly 125 in FIG. 3 is somewhat different from that of FIG. 2 in that the roof rafters such as rafters 126 are U-shaped, upwardly bowed members which underlie transversely extending roof panel joints, such as joint 127, in such manner that the channels are disposed below the joints into which any water seeping through the roof panel joint will pass and be collected. These rafters underlie the roof covering 120 and are rigidly connected at their ends, such as the end 130 of rafter 126, by means of welds, such as weld 131, to the inside face 132 of the rail 85 adjacent to the upper portion 104 of the web 86. An opening which communicates with the channeled roof rafter, such as hole 133, is provided in the web 86 for each rafter to direct such roof joint seepage as collects in the channels to the exterior of the van body by way of the space between the edge cap 93 and rail 85.

As shown in FIG. 3, the roof covering 120 is composed of panel sections such as 128 and 129, the adjacent edges 134 and 135 of which fold downwardly and back under the respective panels to form folds. The folds 134 and 135 of the respective panels are joined by a member 136 which underlies the adjacent folds and has its respective edge portions, 137 and 138, disposed between the respective panels and their respective folded edges so as to form a folded joint 127 between them. Such joints are reasonably free of excessive leakage but are not dependably completely watertight.

FIG. 4 illustrates still another embodiment of the invention.

In this embodiment the lintel 139 extends along the top 140 of the wall frame 141 and has its outer lip or flange 142 disposed in close proximity to the outer flange of the posts, such as the outer flange 143 of wall post 144. The wall covering 145 lies against the outer face 146 of the wall frame 141 and in this case has an upper edge portion 147 which extends over the top 140 of the frame 141 and is secured thereto between the rail 148 and the lintel 139.

The rest plate portion 149 of the rail in this case overlies an outer portion 150 of the lintel 139 and an outer portion 151 of the upper edge portion 147 of the wall covering, and at the outer edge 152 of the lintel 139 the plate connects with a rub rail portion 153 which extends downwardly adjacent to the outer flange 142 of the lintel 139 and then outwardly and upwardly in an upward opening U-shaped trough or gutter shaped rub rail portion 153. This portion 153 of the plate 149 cups the lower rib portion 154 of the edge cap 155 so that water seepage is discharged thereinto and from which it may be led to a suitable discharge point such as at the rear of the van body.

The web portion 156 of the rail 148 joins at its lower edge 157 with the inner edge 158 of the plate 149 and at its upper edge 159 with the inner edge 160 of the flange 161, the respective upper and lower portions 162 and 163 of the web 156 being separated by a step portion 164 which is spaced below the flange 161 and above the plate 149. The disposition of the step portion 164 inwardly of the plate 149 and above an inner portion 165 of the lintel 139 serves the purpose of providing a space above the lintel 139, specifically above the inner portion 165 thereof, in which lugs may be positioned in spaced relationship to secure the rail 148 to the lintel 139 as previously shown with respect to the embodiments illustrated in FIGS. 2 and 3. Thus L-shaped lug 167 is attached by a weld 168 along the bottom 169 of the step portion 164 and the rail 148 is secured to the lintel 139 by means of a nut 170 and a bolt 171 on which the nut 170 is threaded and which extends through the bottom leg 172 of the lug 167 and the inner portion of lintel 139 as well as the intervening edge portion 148 of the wall covering 145.

The flange 161 in the embodiment shown in FIG. 4 extends outwardly from the upper portion 162 of the web 156 and underlies the contacting edge portions 173 and 174 of the edge cap 155 and roof covering 175 respectively so that the joint 176 formed thereat by the passage of metal fasteners, such as the rivet 177, through the edge portions and the flange 161 is spaced outwardly of the upper portion 162 of web 156. This again enables water seepage through the joint 176 to be trapped in the space, between the rail 148 and the edge cap 155, from which it may pass downwardly to the trough 153 by passing freely between the spaced tabs and by leaking out between the lower portions of the rail and edge cap.

The wall edge portion 179 of the edge cap 155 is secured to metal tabs by means of screws, such as screw 180 to tab 181, the tab 181 being one of several such tabs which are spaced along and welded, as by means of weld 182, to the edge 183 formed at the juncture of the trough 153 and the plate 149.

The roof covering 175 in FIG. 4 is composed of a metal skin which overlies the L-shaped roof rafters or beams, such as rafter 185, and the rafters are suitably connected at spaced intervals to the inner face 186 of the rail 148 adjacent to the upper portion 162 of the web 156 so as to support the roof covering 175 thereabove.

The embodiment shown in FIG. 5 is like that shown in FIG. 2, particularly insofar as the outer wall assembly 6 and outer roof assembly 7 are concerned, additions having been made to the structure shown therein however, to provide for insulating the interior of the van body in accord with the embodiment shown in FIG. 1. The additions include roof batten 192 which is suspended from the outer roof assembly 7 in a manner such that rigid insulation blocks or sections are positioned above the batten and supported thereon, and also include wall batten 205 which is fixedly spaced from the outer wall assembly 6 by a rod-like spacing or batten-supporting element 189 which extends inwardly of the van body and which supports certain of the wall insulation blocks and aids in maintaining other insulating blocks in their proper positions, all as later particularly described. Underlying and suitably attached to the roof assembly 7 through connection to batten 192 supported from the roof frame is an inner roof covering, such as metal sheet panel 190. An inner wall covering, such as sheet panel 191, is provided and disposed inwardly of and parallel to the wall frame and is attached to the frame through attachment to batten 205.

The roof and wall battens are provided in numbers sufficient properly to retain insulating blocks of the desired size in position, and the roof battens, as well as the wall battens, are preferably arranged parallel to one another as shown in FIG. 1. It will be understood, accordingly, that the structure comprising the battens may be repeated at several parts of the van body. Under some circumstances, only one roof batten, such as batten 192, may be required adjacent each side edge of the roof structure, and only one wall batten, such as batten 205 may be required for a particular van wall. However that batten may be repeated, if desired, at each wall post and at each roof rafter as shown in FIG. 1.

The roof batten 192 is suitably spaced below the outer roof assembly 7 by means of a rod-like elongated spacing and suspension element 193, which is secured to the roof batten in a manner similar to that by which the wall spacing element 189 is secured to the wall batten 205. The upper end 194 of the suspension element 193 is suitably attached, as by weld 195, to the web portions 196 of the roof rafter 15. The lower end 197 of the rod-like inwardly and downwardly extending suspension element 193 is spaced below the rafter 15 and engages within a suitably positioned hole 200 in the roof battens 192. The hole 200 is countersunk along the inner face 201 of roof batten 192 and the batten is fastened to the suspension element 193 by a pair of nuts 198 and 199. The lower nut 199 engages the threads of the suspension elements 193 within the countersunk portion 202 of the hole 200 so that the end extremity 203 of the element 193 and the lower nut 199 is offset upwardly from the inner face 201 of the batten, and thus not in contact with the roof panel 190 which underlies the inner face 201 of batten. The other or upper nut 198 is positioned on the element 193 along the upper faces 204 of the roof batten 192 so as to rigidly fix the batten thereon and restrain it from vertical movement on the suspension element 193, the upper nut being threaded against the overlying intermediate roof insulation block 219 prior to the positioning of the batten 192 on the suspension rod 193.

The inner wall batten 205 is spaced from the wall assembly 6 in substantially the same manner as the inner roof batten 192 is spaced from the roof assembly. Thus, the spacing element 189 has an end portion 206 which is suitably secured, as by means of weld 207, to a rigid wall frame member, which in this case is the web portion 208 of the Z-shaped wall post 11, and the elongated spacing element 189 extends horizontally inwardly from the outer wall frame to its inner end 210 which passes into a suitably positioned hole 209 in the wall batten 205, and the batten 188 is fixed on the element 189 by inner and outer nuts, 211 and 212 respectively. The hole 209 in the wall batten is countersunk at its inner end 213 along the inner face 214 of the wall batten so that the inner nut 212 and the end extremity 215 of the spacing element 189 are offset outwardly from the metal wall panel 191.

It will be understood that the wall and roof battens are composed of wood or the like and that the metal wall panels 190 and 191 are suitably attached thereto, as by means of screws 216 and 216' in a manner such that the inner ends of the rods 189 and 193 are spaced outwardly from the respective panels, 191 and 190, which form an inner lining for the van body. This spacing avoids any complete heat conductive metal channel or path from the inner panels 190 and 191 to the exterior of the van body by direct metal to metal contact between the panels and the ends of their respective rod-like element.

The rod elements 193 and 189 also hold the blocks of insulation in their respective positions. For example, in assembling the inner structure of the van body, the elongated spacing elements such as 193 and 189 are respectively attached to the outer roof rafters and wall post members, such as rafter 15 and post 11. Thereafter, the outer wall insulation blocks, such as block 217, and the outer roof insulation blocks, such as block 218, are respectively positioned between adjacent posts and between adjacent rafters. Next, the intermediate roof insulation blocks, such as block 219, which have been previously drilled with suitable holes, such as hole 220, to permit passage of the respective spacing elements therethrough, are placed upon the suspension rods in a position such that they underlie the outer roof insulation blocks as the block 219 underlies the block 218. The intermediate roof insulation blocks are held in place by threading the upper nuts on the rods as nut 198 is threaded on rod 193. Next the roof battens, such as batten 192, are placed upon the support rods and are secured thereon by means of the lower nuts such as the nut 199 is employed to secure batten 192 on rod 193. It will be noted that the holes 200 and 220 in the batten 192 and block 219 respectively are aligned for reception of the rod 193 therethrough. When thus secured, the roof battens support the intermediate roof insulation blocks, and the suspension rods, such as rod 193, prevent lateral movement of the intermediate blocks. It will be noted that the intermediate roof insulation block 219 fits beneath the step portion 64 of the rail at its end 221, thereby lapping the end 222 of the outer roof insulation block 218. After securing the roof battens in place, the intermediate wall insulation blocks, such as block 229, which have been drilled with suitable holes such as hole 223 for the reception of the wall spacing rod elements, are placed upon the rods such as rod 189 and the outer nuts, such as 211, threaded thereon. The inner wall battens are then positioned on the spacing rod elements, as batten 205 is positioned on rod 189, and the inner nuts threaded on the wall spacing rods and positioned in the countersunk portion of the holes in the wall batten as exemplified by the nut 212 which threadedly engages the end 210 of the rod 189 in the countersunk portion 213 of the hole 209 of wall batten 205. It will be noted that the upper end 224 of the intermediate wall insulation block 229 at the upper edge of the van body engages and supports the end portion 221 of the intermediate roof insulation blocks 219 and preferably retains such portion flush against the bottom of the step 64. It will be apparent that the intermediate insulation blocks, such as 229, are held in position by the rod-like spacing elements, and that the intermediate blocks, in turn, retain the outer wall insulation blocks, such as block 217, flush against the outer wall covering.

After the wall and roof battens 205 and 192 have been secured to their respective rod elements, 189 and 193, an edge insulation block 225 is placed adjacent to the roof batten 192 as shown in the FIG. 5, and the inner wall insulation blocks such as block 226 are placed between adjacent wall battens so that the upper ends of the blocks retain the edge block 225 in place as the upper end 230 of block 226 is positioned against the edge block 225 in FIG. 5. Thereafter the wall panel 191 is placed against the inner wall insulation block 226 and suitably secured to the inner wall batten 205 as by screw 216'. Next, the inner roof insulation blocks, such as block 227, are positioned between adjacent roof battens and the roof panel 190 suitably secured to the inner face 201 of the roof batten 192 so that the blocks such as block 227 are held in their indicated position. A suitable corner forming member, such as member 228, is preferably employed at the corners of the roof panel 190 and wall panel 191 to provide a juncture therebetween.

To further insulate the interior of the van body in the regions at the corners of the van body, loose insulation material 2 may be suitably disposed in the space provided between the rail 17 and the edge cap 16.

As shown in FIG. 1, the side wall panels 242 and 243 of the van body shown therein extend lengthwise of the van body 1 and are secured to the wall frame 8 by means of suitable metal fasteners 3. The means by which these panels 242 and 243 are secured to the wall frame 8 is best illustrated in connection with FIG. 6 wherein it will be seen that a hollow rib 240 rectangular in cross section is employed as a means to which the panels 242 and 243 are attached, as by the screw 3. The hollow rib 240 extends lengthwise along the van body and is suitably secured to the wall posts, as for example post 11 in FIG. 6, by welding, as at 247. The lower side wall panel 243 contacts the outer face 248 of the post 11 and has an upper edge portion 249 which extends outwardly from the generally vertical plane of the panel covering beneath, and in contact with the lower face of the rib 240 and thence upwardly along the outer side 250 of the rib. Along this outer side 250 of the rib, the upper edge portion 249 of the panel 243 is overlapped by a lower edge portion 251 of the upper panel 242 and is secured to the rib 240 by means of screw 3 and a molding 252 the latter of which is disposed in juxtaposition to the edge portion 249 of the panel 243 and against the lower edge portion 251 of the upper panel 242. The lower edge portion of the upper panel 242 also extends outwardly from the general plane of the wall covering but in this case it extends in an overlying relationship to the hollow rib 240 and then passes downwardly over the outside 250 of the rib to overlie the upper edge portion 249 of the lower panel 243. The fasteners, such as fastener 3, pass through the molding 252, and the edge portions 249 and 251 of the panels 243 and 242 and terminate within the confines of the hollow rib. It will be evident that through the use of the hollow rib it is unnecessary to attach the wall panels by fastening means which penetrate to the interior of the van body. Instead any leakage through the holes formed for the reception of the fasteners is confined to the exterior of the van and at most only enters the confines of the rib from which it may be lead to a suitable exterior discharge point. Suitable sealing strips may be provided in the joint formed along the rib in a manner familiar to those skilled in the art and similar to those used for sealing the roof edge joint shown in FIG. 2.

Figure 6:
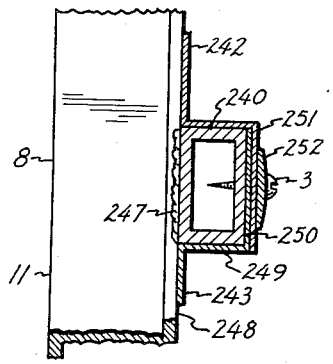
FIG. 6 is a fragmentary end view taken in section along line 6—6 of FIG. 1 illustrating means for fastening side wall panels to the wall frame of a van body.
Figure 7:
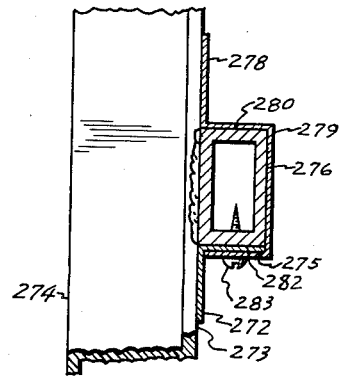
FIG. 7 is a similar sectional end view showing modified means for fastening side wall panels to the wall frame.

FIG. 7 is another view showing an embodiment employing the concepts illustrated in FIG. 6. In FIG. 7 the lower panel 272 is disposed against the outer face 273 of an upstanding post 274 and the upper edge portion 275 of the panel 272 extends outwardly from the plane of the wall covering beneath and contiguous to the hollow rib 276. The upper panel 278 is disposed against an upper portion of the outer face 273 of the post 274 and, in this case, its lower edge portion extends outwardly along the upper face 280 of the rib and then downwardly along its outer face and inwardly to overlap the upper edge portion 275 of the lower panel beneath and along the bottom face 282 of the rib. At this point the overlapped edge portions 275 and 279 are joined to the rib by fasteners, such as screw 283, which terminate within the hollow portion of the rib 276. Like the embodiment shown in FIG. 6, the one illustrated in FIG. 7 provides for the use of metal fasteners yet in a manner such that they do not penetrate to the interior of the van body.

Figure 8:
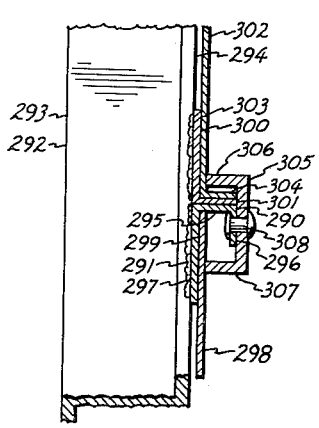
FIG. 8 is a similar sectional end view showing a further modified means for fastening side wall panels to the wall frame.

In FIG. 8 there is illustrated a second modified embodiment of an intermediate or belt rail by means of which upper and lower wall panels are attached to a wall frame of a van body to secure an attachment including metal fasteners which do not penetrate into the body interior. In this figure, a longitudinal structural member 290 extends along the wall frame 293 and is suitably fastened as by means of welds, such as weld 291, to upstanding posts, such as post 292, thereof. Top portion 295 of member 290 extends outwardly from the face 294 of the wall frame and then passes downwardly to form rib portion 296 which is spaced outwardly from the face of the wall frame and from its post-attached inner portion 297. Bottom wall panel 298 has an upper portion 299 which extends into the space behind rib portion 296, and between the rib portion and the inner portion 297, of the member. Panel 298 below the rib engages against the face of the wall frame posts. Above member 290 is an L-shaped structural member 300 similarly attached to the wall posts and having a lower outwardly extending leg portion 301 that overlies and preferably engages against portion 295 of member 290. Upper wall panel 302 is disposed against the wall frame and at its lower end overlies the outer face 303 of member 300. A lower edge portion 304 of panel 302 is bent outwardly to extend along leg portion 301 of member 300. The panels 298 and 302 are secured to the wall frame 293 by means of a rigid U-shaped molding or cap member 305 which extends along the side of the van body and forms an intermediate or belt rub rail. Member 305 has inwardly extending flanges 306 and 307 which engage against and hold the wall panels 298 and 302 flush against the inner portion 297 of member 290 and against the outer face 303 of member 300. Metal fasteners, such as rivet 308, secure member 305 to the lip 296 of member 290. The rivets are located outwardly of outer wall panel 298 and do not penetrate into the van body.

Figure 9:
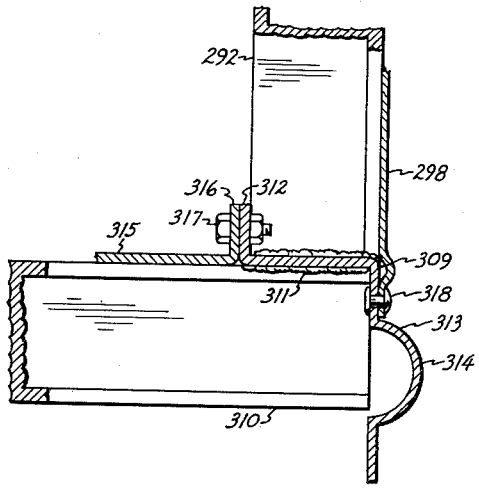
FIG. 9 is a sectional fragmentary view of a lower wall and floor construction adapted for use in a van body in accord with the invention.

FIG. 9 shows a lower corner construction adapted for embodiment in van bodies in accord with this invention. In this construction outer wall panel 298 is disposed against the post or stanchion 292 and the post 298 is suitably attached at its lower end to a base plate 309 which extends along the edge of the van body and is attached to floor joist 310 as by means of weld 311. Plate 309 has an upstanding inner lip or flange 312 disposed inwardly of post 292 and a downward extension 313 located at its outer side which forms a bottom rub rail for the body. The rub rail 313 has a bulging portion 314 which extends outwardly of the wall panel 298 and which is disposed adjacent the ends of the floor joist 310. A sheet metal floor plate 315 rests upon the floor joist and has an outer upstanding flange edge portion 316 which is attached to the lip 312 by fasteners such as bolt 317. The wall panel may be attached to bottom rub rail 313 by suitable fasteners, such as rivet 318.

From the foregoing it is evident that the invention provides a means by which the elements of a van body roof assembly may be attached to the wall assembly of the van body without providing channels through which water may seep into the interior of the body or into the insulation of the insulated body and yet the means permits the use of common types of penetrating attachment means, such as bolts and screws or the like. In this invention, the rail design is such that it excludes water seepage from the interior of the van body and directs it to the exterior. The top edge rail construction is especially suited for insulated van bodies, although not limited thereto, in that by the exclusion of water seepage the insulation is maintained in a dry state and thereby retains its maximum insulation and strength properties. The inner wall and ceiling suspension method shown and described herein has been found especially effective in that the insulating blocks are firmly held in their intended positions and not disturbed by the jolts and movements to which van bodies are subjected, and further in that the spacing elements are so fixed on the battens that there is no metal to metal contact between the outer and inner metal walls or between the inner ceiling and the outer roof. Such very small heat transfer between the exterior of the van and the inner walls and ceiling as may occur, therefore, must take place primarily through the insulation blocks, as opposed to taking place through any metal elements which would transmit heat at a rate far in excess of that through the insulation.

It will also be noted that the rail step provides needed space for insulation blocks and minimum encroachment upon the interior capacity of the body, while the rail itself serves as a rigid structural member and as a water guard sufficiently heavy to minimize the possibilities of damage at this relatively vulnerable portion of the body which might, in a thinner member, result in the occurrence of openings through which water might then seep.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a van body, a wall lintel having a flat generally horizontal upper surface, a roof covering having an edge portion disposed spacedly above said lintel, a rail including a continuous unbroken web extending along said lintel and upwardly therefrom and spanning between said lintel and said covering, said rail further including a continuous unbroken plate extending along and resting flat on said flat upper surface of said lintel outwardly of said web and being joined to said web continuously along the lower edge of said web, said rail further including a flange rigidly connected continuously along and extending outwardly from the top edge of said web, said flange being supportingly disposed beneath and connected to said roof edge portion outwardly of said web, and means connecting said rail to said lintel.

2. In a van body, a wall lintel and a roof covering having an edge portion spaced above said lintel, a rail extending along said lintel between said lintel and said roof covering including a flange disposed beneath said edge portion, fastener means passing through and forming a joint between said edge portion and said flange, said rail further including a web connected to said flange inwardly of said joint and a plate connected to said web resting on said lintel, and means disposed inwardly of said plate joining said lintel to said rail.

3. In a van body, a wall lintel and a roof covering having an edge portion spaced above said lintel and extending therealong, an edge cap having a roof edge portion lapping said roof covering edge portion and a wall edge portion disposed outwardly of and below said edge portion, a flange underlying said lapped portions and fastener means passing through said lapped portions and said flange and forming a joint therebetween, means shielding the interior of said van body from leakage through said joint, said means comprising a web connected to said flange inwardly of said joint and a plate connected to said web resting on said lintel, means connecting said wall edge portion to said rail and means disposed inwardly of said plate connecting said rail to said lintel.

4. In a van body, a wall frame having a lintel and a wall covering lying against said frame in a generally vertical plane, a rail extending along said lintel having a plate resting thereon and extending above said wall covering and through said plane thereof and a flange spaced above said plate, a roof covering having an edge portion overlying said flange, an edge cap having an edge portion lapping said roof covering edge portion and having a wall edge portion disposed outwardly and downwardly from said edge portions, means connecting said wall edge portion to said rail below said flange, fastener means connecting and forming a joint between said flange and said lapped portions, whereby said rail constitutes a shield against leakage into the interior of said van body.

5. In a van body, a wall frame having a lintel extending along the top of said frame, a wall covering lying outwardly of and against said frame in a generally vertical plane, a roof covering having an edge portion disposed above and spaced from said lintel, an edge cap having a roof edge portion overlapping said roof covering edge portion and a wall edge portion extending outwardly and downwardly from said roof edge portion, a rail extending along and resting on said lintel including a flange disposed beneath said lapped portions, fastener means forming a joint between and extending through said lapped portions and said flange, said rail further including means shielding the interior of said van body from leakage through said joint comprising a plate resting on said lintel and extending outwardly above said wall covering and through said plane to the exterior of said van body, and a web having a lower edge joined to an inner portion of said plate and an upper edge joined to said flange inwardly of said joint, said web having an inward step portion spaced between its said edges, means disposed below said step portion connecting said rail to said wall frame and means connecting said wall edge portion of said edge cap to said rail.

6. In a van body, a wall frame having a lintel extending along the top of said frame, a wall covering on said frame lying outwardly thereof in a generally vertical plane, a roof covering having an edge portion spaced above and extending along said lintel, an edge cap extending along said lintel having a wall edge portion disposed outwardly of said roof covering and a roof edge portion lapping said edge portion of said roof covering, a flange supportingly disposed beneath said lapped edge portions and fastener means passing through said flange and said lapped portions forming a joint therebetween, means shielding the interior of said van body from leakage through said joint and supporting said flange, said means comprising a plate extending along and resting on an outer portion of said lintel above said wall covering and extending through said plane, and a web having a lower edge joined to an inner edge of said plate and an upper edge joined to an inner edge of said flange, said web having a step portion spaced between its said edges and above an inner portion of said lintel, a lug connected to said inner portion of said lintel and joined to said web at an inner face thereof, and means connecting said wall edge portion of said edge cap to said rail.

7. In a van body, a wall frame having a lintel extending along the top thereof, a wall covering lying against the outside of said frame in a generally vertical plane, a roof covering having an edge portion disposed above and extending along said lintel, an edge cap having a roof edge portion overlapping and extending along said roof covering edge portion and a wall edge portion extending downwardly of said roof edge portion in a plane generally parallel to the plane of said wall covering, a roof supporting rail extending along said lintel and disposed between said lintel and said lapped edge portions including an upstanding web, a plate resting on said lintel and having an inner edge connected to the bottom edge of said web, and a flange having an inner edge connected to the upper edge of said web, said flange underlying and being connected outwardly of said upper edge to said lapped edge cap and roof covering edge portions, spaced rafters supportingly underlying said roof covering inwardly of and connected at respective ends to said web spacedly along the inner face of said web, and means disposed inwardly of said plate rigidly joining said rail to said wall frame, said wall edge portion of said edge cap being attached to said rail along an outer face thereof and said rail being continuous and impervious to water at least throughout all portions thereof which are disposed inwardly of the outer of said parallel planes and between and below said roof rafters.

8. In a van body, a wall lintel and a roof covering having an edge portion disposed above said lintel, a rail including a continuous unbroken web extending along said lintel between said lintel and said covering and a continuous unbroken plate extending along and resting on said lintel outwardly of said web and being joined to said web continuously along the lower edge of said web, said rail further including a flange rigidly connected along and extending outwardly from the top edge of said web, said flange being supportingly disposed beneath and connected to said roof edge portion outwardly of said web, and means disposed inwardly of said plate connecting said rail to said lintel.

9. In a van body, a wall frame having a lintel extending along the top of said frame, a wall covering lying outwardly of and against said frame in a generally vertical plane, said covering having an upper edge portion extending outwardly from said plane, said lintel extending outwardly from said plane and overlying said upper edge portion of said wall covering, means disposed outwardly of said plane attaching said upper edge portion to said outward extension of said lintel, a roof covering having an edge portion disposed above and extending along said lintel, a rail resting on and extending along said lintel having a flange spaced above said lintel and disposed beneath said roof covering edge portion, means connecting said edge portion of said roof covering to said flange forming a joint thereat, an edge cap having a roof edge portion lapping said roof covering edge portion and connected to said flange by said joint forming means, said edge cap having a wall edge portion disposed outwardly and downwardly of said joint, said rail comprising a plate resting on an outer portion of said lintel and a web having a lower edge connected to said plate along an inner edge thereof and having an upper edge joined to said flange inwardly of said joint, said web having a step portion spaced between its said edges and extending inwardly spacedly above the inner portion of said lintel, and a lug disposed beneath said step portion on said inner part of said lintel connected to said rail and to said inner lintel portion.

10. In a van body, a wall frame having a lintel extending along the top of said frame, a wall covering lying in a generally vertical plane outwardly of and against and connected to said frame, an edge cap extending along and generally above said lintel having a wall edge portion and a roof edge portion disposed above and inwardly of said wall edge portion, a roof covering having an edge portion lapping said edge cap roof edge portion, and a rail extending along and resting on and connected to said lintel and having a flange underlying said lapped edge portions, fastener means passing through said flange and said lapped portions forming a joint thereat, said rail including means shielding the interior of said van body from water seepage through said joint comprising a web having a step portion disposed above an inner portion of said lintel, said web terminating downwardly at said lintel and having an upper edge joined to said flange inwardly of said joint.

11. In a van body, a wall frame having a lintel extending along the top of said frame, a wall covering lying in a generally vertical plane outwardly of and against and connected to said frame, an edge cap extending along and generally above said lintel having a wall edge portion and a roof edge portion disposed above and inwardly of said wall edge portion, a roof covering having an edge portion underlapping said edge cap roof edge portion, a flange underlying said lapped edge portions, fastener means passing through and joining said flange and said lapped edge portions, a plate resting on and joined to said lintel, and a web having a step portion disposed above an inner portion of said lintel, said web having a lower edge joined to said plate and an upper edge joined to said flange inwardly of said joint.

12. In a van body, a wall frame having a lintel extending along the top of said frame, a wall covering lying in a generally vertical plane outwardly of and against and connected to said frame, an edge cap extending along and generally above said lintel having a wall edge portion and a roof edge portion disposed upwardly and inwardly of said wall edge portion, a roof covering having an edge portion lapped with said edge cap roof edge portion, a rail extending along and resting on said lintel having a flange underlying said lapped edge portions, fastener means passing through and joining said flange and said lapped edge portions, said rail comprising a plate resting on an outer portion of said lintel and a web having a step portion disposed above an inner portion of said lintel, said web having a lower edge joined to said plate and having an upper edge joined to said flange inwardly of said fastener means, and tab means on said web attached to said wall edge portion of said edge cap, whereby said web and plate shield the interior of said van body against water seepage through said joint.

13. In a van body, a wall lintel, and a roof covering having a transverse joint therein and having an edge portion spaced above said lintel, a U-shaped roof rafter supportingly underlying said roof covering joint inwardly of said edge portion forming a channel for the reception of water seepage through said joint, a rail extending along and joined to said lintel and having an upper flange supportingly underlying and joined to said roof covering edge portion, said rail further including a plate and a web, said web having an upper edge connected to said flange inwardly of said roof covering edge portion joint and having a body portion disposed against and joined to the end of said rafter, said body portion having an opening therethrough communicating into said channel, said plate being connected to said web below said opening and resting on said lintel.

14. In a van body, a wall frame having a lintel, a wall covering on the outer face of said frame disposed in a generally vertical plane, a roof covering having an edge portion disposed above said lintel and inwardly of said plane, an edge cap disposed above and extending along said lintel having a roof edge portion in juxtaposition to said roof covering edge portion and having a wall edge portion disposed outwardly of and below said juxtaposed portions, a roof supporting rail extending along said lintel having a flange supportingly disposed beneath said juxtaposed portions, fastener means passing through said juxtaposed portions and said flange forming a joint therewith, said rail further including a web having upper and lower edges and being connected at its upper edge to said flange inwardly of said joint, a plate resting on said lintel and extending outwardly of said plane and joined along an inner portion to the bottom edge of said web, said web having a step portion facing outwardly and spaced above said lintel inwardly of said plate, a lug joined to said rail below said step portion having a leg portion resting on said lintel, means passing through said leg and said lintel connecting said lug to said lintel, a tab attached to said rail on the outer face thereof, and means passing through said tab and said wall edge portion of said edge cap connecting said edge cap to said rail.

15. In a van body, a wall frame having a lintel with a portion extending outwardly of the outer face of said frame, a wall covering on said outer face disposed in a generally vertical plane having an upper portion underlying said outward lintel extension portion, a roof covering having an edge portion disposed above said lintel, an edge cap extending along said lintel having a roof edge portion lapping said roof covering edge portion and having a lower edge portion disposed outwardly of and below its said roof edge portion, a roof supporting rail extending along said lintel having a plate with an inner portion resting on said lintel and an integral outer portion extending outwardly from said inner portion and terminating in a downward lip to form a rub rail spaced outwardly of said plane, means disposed outwardly of said plane connecting said upper portion of said wall covering to said lintel extension portion and to said plate, said rail further including a flange supportingly disposed beneath said joined edge portions and a web having a lower portion joined to said inner portion of said plate and an upper portion joined to said flange inwardly of said lapped edge portions, means passing connectingly through said flange and said lapped edge portions, said web having a step portion facing outwardly and spaced above said lintel, a lug joined to said rail and disposed below said step portion, said lug having a leg portion resting on said lintel, means passing through said leg portion and said lintel connecting said lug to said lintel, and mounting tab means attached to said rail along its outer face connected to said lower edge portion of said edge cap.

16. In a van body, a wall frame having a wall post and a lintel, an outer wall covering disposed against the outer face of said wall frame, an outer roof covering having an edge portion disposed above and extending along said lintel, an edge cap having a roof edge portion lapping said roof covering edge portion and a wall edge portion outwardly of and below said lapped portions, a roof supporting rail having a flange supportingly disposed beneath and connected to said portions, said rail having means to guide water leakage from said connection to the exterior of said van body including a plate resting on said lintel and a web connected to said flange inwardly of said connection thereof to said lapped portions, a rafter supportingly disposed beneath said roof covering having an end joined to said web along its inner face, means disposed inwardly of said plate connecting said rail to said lintel, an elongated, rigid, insulating material wall batten spaced inwardly of said wall posts, elongated support means extending between said batten and said wall frame and supportingly connecting said batten to said wall frame, an elongated, rigid insulating material roof batten spaced below said rafter, elongated support means extending between said roof batten and said rafter supportingly connecting said roof batten to said rafter, an interior wall member connected to and disposed inwardly of and against said wall and roof battens, and insulation blocks disposed between said interior wall member and said outer wall and roof coverings.

17. In a van body, a wall frame having a wall post and a lintel, an outer wall covering disposed against the outer face of said wall frame, an outer roof covering having an edge portion disposed above and extending along said lintel, an edge cap having a roof edge portion lapping said roof covering edge portion and a wall edge portion outwardly of and below said lapped portions, a roof supporting rail having a flange supportingly disposed beneath said portions, fastener means passing through said lapped portions and said flange forming a joint thereat, said rail having means to guide water leakage from said joint to the exterior of said van body including a plate resting on an outer portion of said lintel and a web connected to said flange inwardly of said joint, said web having a step portion above and inwardly of said plate, lug means disposed beneath said step portion on an inner portion of said lintel connected to said rail and to said lintel, a rafter supportingly disposed beneath said roof covering having an end joined to said web along its inner face, an elongated rigid insulating material wall batten spaced inwardly of said wall posts, elongated support means extending between said battens and said wall frame and supportingly connecting said batten to said wall frame, an elongated rigid insulating material roof batten spaced below said rafter, elongated support means extending between said roof batten and said rafter supportingly connecting said roof batten to said rafter, an interior wall member connected to and disposed inwardly of and against said wall and roof battens and insulation blocks disposed between said interior wall member and said outer wall and roof covering.

18. In a van body, side and end wall posts having upper ends, a roof rail and lintel assembly comprising an elongated generally horizontal plate portion extending along the walls of the body overlying the upper ends of said posts and supported thereon, said plate portion having inner and outer edges, said outer edge being disposed adjacently along the outer sides of said posts at said upper ends thereof and having a downward flange attached therealong disposed outwardly of said posts, said downward flange having a lower edge, a wall covering on said posts having an upper edge portion extending above said lower edge and disposed inwardly of said downward flange, an unbroken web element extending along said plate portion having a lower edge of said web element joined in continuous watertight sealed relation to said plate portion and said web element extending upwardly from its said lower edge, said web element having an upper edge spaced above its said lower edge, an outwardly directed flange joined in continuous watertight sealed relation to said web element along said upper edge thereof, a roof covering having an edge portion supportedly overlying said outwardly directed flange, and means outwardly of said web element joining said edge portion of said roof covering to said outwardly directed flange.

19. In a van body, a wall frame having a post, a lintel and an outer wall covering disposed against the outer face of said post in a generally vertical plane, said wall covering having an upper edge portion which extends outwardly from said plane, said lintel having an outer portion which extends outwardly from said plane overlying said wall covering edge portion and an inner portion inwardly thereof, fastener means connecting said wall covering upper edge portion to said outer portion of said lintel, a roof assembly including a roof covering having an edge portion, a roof covering supporting rafter, an edge cap having a roof edge portion lapping said roof covering edge portion and a lower portion disposed outwardly of and extending downwardly from said roof edge portion in a plane generally parallel to said plane of said roof covering, and a rail interposed between said roof covering edge portion and said lintel, said rail including a flange portion underlying said lapped edge portions, fastener means connecting said lapped edge portions to said flange portion forming a joint thereat, said rail further including means shielding the interior of said van body from leakage from said joint comprising an upstanding web portion connected along its upper edge to said flange portion inwardly of said joint and a plate portion resting on said outer portion of said lintel connected along its inner edge to a lower edge of said web portion, said web portion having a first step portion disposed spacedly above said inner portion of said lintel and a second step portion disposed spacedly above and inwardly of said first step portion, a lug having an upstanding leg disposed against and connected to the bottom of said first step portion and another leg resting on said inner portion of said lintel, a bolt passing through said other leg and said inner portion of said lintel and a nut threadedly engaged on said bolt and clamping said lintel to said other leg, releasable fastener means joining said lower portion of said edge cap to said rail adjacent said step portion of said web, insulation blocks disposed in the interior of said body against said wall and roof assemblies respectively, each of said blocks having a hole extending therethrough, elongated rigid insulating material roof and wall battens disposed spacedly inwardly of said roof and wall assemblies respectively and against respective said blocks, each of said battens having a hole extending therethrough which is countersunk along the inner face of said batten and which is in alignment with a hole of a respective insulation block, elongated rod means attached at respective one ends to said roof and wall assemblies respectively extending through respective aligned holes of said insulation blocks and battens and terminating within the respective countersunk portions of respective battens with threaded ends, nuts respectively engaging respective said threaded ends within said countersunk portions and an interior lining against and secured to said battens.

20. In a van body, a wall lintel and a roof covering having an edge portion spaced above said lintel and extending therealong, an edge cap having a roof edge portion lapping said roof covering edge portion and a wall edge portion disposed outwardly of and below said edge portion, a flange underlying said lapped portions and removable fastener means passing through said lapped portions and said flange and forming a joint therebetween, means shielding the interior of said van body from leakage through said joint, said means comprising a web connected to said flange inwardly of said joint and a plate connected to said web resting on said lintel, means connecting said wall edge portion to said means exteriorly of said van body, means disposed inwardly of said plate connecting said plate to said lintel, a lamp supported exteriorly on said roof edge cap, wiring connected to said lamp disposed protectedly between said lamp and said rail.

21. In a van body, a wall frame, an elongated member attached to said frame spaced above the bottom of said frame having an outwardly extending portion and a downwardly extending lip portion attached to said outwardly extending portion, said lip portion being disposed spacedly outwardly of said frame, a lower wall panel retained against said frame having an upper portion disposed between said lip portion and said frame, an upper wall panel retained against said frame above said elongated member having an outwardly extending lower portion adjacent to and disposed above said outwardly extending portion of said elongated member and a second elongated member disposed against and attached to said lip and having inwardly directed flanges retainingly engaging said wall panels.

22. In a van body, a wall frame, an elongated member attached to said frame spaced above the bottom of said frame having an outwardly extending portion and a downwardly extending lip portion attached to said outwardly extending portion, said lip portion being disposed spacedly outwardly of the outer face of said frame, a lower wall panel retained against said frame having an upper portion disposed in the space between said lip portion and said frame, an upper wall panel retained against said frame above said elongated member having an outwardly extending lower portion adjacent to and disposed above said outwardly extending portion, an L-shaped elongated member attached to said frame and disposed adjacently above said first mentioned elongated member having an outwardly extending lower edge portion overlying said outwardly extending portion of said first mentioned elongated member adjacently below said outwardly extending lower portion of said upper wall panel and a third elongated member attached to said lip having inwardly directed flanges engaged retainingly against said wall panels.

References Cited in the file of this patent

UNITED STATES PATENTS

| | | |
|---|---|---|
| 2,241,749 | Steuber | May 13, 1941 |
| 2,606,058 | Chausson | Aug. 5, 1952 |
| 2,612,028 | Schnabel | Sept. 30, 1952 |
| 2,742,866 | Nystrom | Apr. 24, 1956 |
| 2,758,870 | Nallinger | Aug. 14, 1956 |